US012734098B2

(12) United States Patent
Kuo et al.

(10) Patent No.: US 12,734,098 B2
(45) Date of Patent: Sep. 15, 2026

(54) REHABILITATION DEVICE WITH A ROLLING UNIT TO STRETCH THE UPPER LIMBS

(71) Applicant: National Cheng Kung University, Tainan City (TW)

(72) Inventors: Yao-Lung Kuo, Tainan City (TW); Chih-Han Chang, Tainan City (TW); Li-Chieh Kuo, Tainan City (TW); Kang-Chin Yang, Tainan City (TW); Yu-Chen Lin, Tainan City (TW); Ping-Han Chuang, Tainan City (TW)

(73) Assignee: NATIONAL CHENG KUNG UNIVERSITY, Tainan City (TW)

(*) Notice: Subject to any disclaimer, the term of this patent is extended or adjusted under 35 U.S.C. 154(b) by 719 days.

(21) Appl. No.: 18/208,239

(22) Filed: Jun. 9, 2023

(65) Prior Publication Data

US 2024/0033166 A1 Feb. 1, 2024

(30) Foreign Application Priority Data

Jul. 26, 2022 (TW) .................................. 111128020

(51) Int. Cl.
*A61H 15/00* (2006.01)

(52) U.S. Cl.
CPC . *A61H 15/0085* (2013.01); *A61H 2015/0021* (2013.01); *A61H 2201/0188* (2013.01);
(Continued)

(58) Field of Classification Search
CPC ...................... A61H 1/005; A61H 1/02; A61H 1/0274–0285; A61H 2001/0207;
(Continued)

(56) References Cited

U.S. PATENT DOCUMENTS 3,871,129 A * 3/1975 Tong ...................... A63H 17/40 446/443
6,772,850 B1 * 8/2004 Waters ................. A61G 1/0268 280/43.23

(Continued)

FOREIGN PATENT DOCUMENTS

CN 209172874 U 7/2019
CN 113599194 A * 11/2021 ............. A63B 23/08

(Continued)

OTHER PUBLICATIONS

PE2E Translation Wang CN_113599194_A_H (Year: 2021).*
PE2E Translation JP 2014 JP_3190437_U (Year: 2014).*
PE2E Translation Nakagaki JP_2020081846_A_H (Year: 2020).*

*Primary Examiner* — Victoria Murphy
*Assistant Examiner* — Sydney Reyes Russell
(74) *Attorney, Agent, or Firm* — HDLS IPR SERVICES; Chun-Ming Shih

(57) ABSTRACT

A rehabilitation device includes a base unit, a circuit unit, a rolling unit, and a holding unit. The circuit unit includes a distance measuring element, which is partially exposed on a bottom surface of the base unit and can measure the moving distance of the base unit after the base unit contacts a plane. The rolling unit includes a plurality of rollers partially protruding from the base unit, a driving member, and at least one auxiliary wheel driven by the driving member. The rollers are continuously in contact with the plane, and the auxiliary wheel is driven to contact the plane. The rollers can make the base unit slide, allowing the user to stretch their upper limbs by themselves. When the user moves to his own limit position, the auxiliary wheel can be driven to gradually increase the moving distance of the base unit, so that the upper limb can be continuously stretched, and the limit of the extension distance and joint movement angle of the upper limb can be gradually increased.

10 Claims, 9 Drawing Sheets

(52) U.S. Cl.
CPC ................ *A61H 2201/1207* (2013.01); *A61H 2201/5048* (2013.01); *A61H 2201/5064* (2013.01); *A61H 2201/5092* (2013.01)

(58) Field of Classification Search
CPC .......... A61H 15/0085; A63B 2023/006; A63B 23/12; A63B 23/1209; A63B 23/0355
See application file for complete search history.

(56) References Cited

U.S. PATENT DOCUMENTS

| | | | | |
|---|---|---|---|---|
| 2007/0232966 A1* | 10/2007 | Applebaum | ....... | A61H 15/0085 601/17 |
| 2011/0237400 A1* | 9/2011 | King | .................. | A63B 21/4017 482/8 |
| 2016/0175635 A1* | 6/2016 | Westenberg | ....... | A63B 21/4019 482/114 |

FOREIGN PATENT DOCUMENTS

| | | | | |
|---|---|---|---|---|
| JP | 2009517176 | A | | 4/2009 |
| JP | 2012530580 | A | | 12/2012 |
| JP | 3190437 | U | * | 5/2014 |
| JP | 2020081846 | A | * | 6/2020 |
| TW | M516996 | U | | 2/2016 |

* cited by examiner

REHABILITATION DEVICE WITH A ROLLING UNIT TO STRETCH THE UPPER LIMBS

RELATED APPLICATIONS

This application claims priority of Taiwan Application No. 111128020, filed on Jul. 26, 2022. The entire disclosures of all the above applications are hereby incorporated by reference.

FIELD OF THE INVENTION

The present invention relates to a rehabilitation device, particularly a rehabilitation device that can be used to assist muscles in stretching.

BACKGROUND OF THE INVENTION

Breast cancer is the most common type of cancer in women. Doctors may treat breast cancer with surgery to remove it. Although most tumors can be removed by surgery, there may be some sequelae, such as muscle contracture, decreased joint mobility, or upper limb lymphedema after surgery. In order to overcome the above conditions, the doctor will recommend post-operative rehabilitation exercises.

In the hospital, the physical assistance and guidance of rehabilitation movements can be performed by a rehabilitation therapist. However, the shortage of manpower in hospitals often becomes a limitation in performing specific movement training. In addition, when patients stretch themselves at home, there is no appropriate rehabilitation equipment to use. At the same time, the self-extending angle may be limited due to postoperative tissue or scar contracture, lymphedema or pain, and resulting in unsatisfactory effects of home rehabilitation, which will affect work performance or daily activities of patients.

SUMMARY OF THE INVENTION

One object of the present invention is to provide a rehabilitation device that solves the above problems.

The rehabilitation device comprises a base unit, a circuit unit arranged in the base unit, a rolling unit arranged in the base unit, and a holding unit arranged on the base unit. The base unit includes a top surface and a bottom surface. The circuit unit includes a circuit board, a power supply electrically connected to the circuit board, and a distance measuring element electrically connected to the circuit board. The distance measuring element is partially exposed on the bottom surface of the base unit and can measure the moving distance of the base unit. The rolling unit includes a plurality of rollers arranged at intervals and partially protruding from the bottom surface of the base unit, a driving member electrically connected to the power supply, and at least one auxiliary wheel driven by the driving member. The rollers are continuously in contact with the plane, the at least one auxiliary wheel is not in contact with the plane until it is driven. The holding unit includes a holding member for accommodating a user's hand, and an activation switch arranged under the holding member. The activation switch is used to activate the driving member of the rolling unit.

In a preferable embodiment, the at least one auxiliary wheel has at least one first surface, and at least one second surface connected to the at least one first surface. The extending direction of the at least one first surface corresponds to the bottom surface of the base unit when the auxiliary wheel is not driven, and the at least one second surface protrudes out of the bottom surface and back into the base unit when the auxiliary wheel is driven.

In a preferable embodiment, the rehabilitation device further includes an information unit disposed in the base unit and electrically connected to the power supply. The distance measuring element of the circuit unit is electrically connected to the information unit, the distance measuring element can measure the moving distance of the base unit relative to the plane and record it in the information unit, and the information unit can transmit data.

In a preferable embodiment, the distance measuring element is a distance measuring wheel partially protruding from the bottom surface of the base unit.

In a preferable embodiment, the distance measurement method of the distance measurement element is selected from optical image distance measurement or ultrasonic distance measurement.

In a preferable embodiment, the holding member of the holding unit can pivot relative to the base unit.

In a preferable embodiment, the base unit includes an upper case, a lower case combined with the upper case, and a plurality of light-emitting elements exposed on the upper case and electrically connected to the power supply. The circuit unit further includes an attitude sensor arranged on the circuit board, and the attitude sensor can make the light-emitting elements illuminate corresponding to the rotation orientation of the holding member.

In a preferable embodiment, the holding member has an arc-shaped groove, and the holding unit further includes a locating member fixed on the upper case of the base unit passing through the arc-shaped groove.

In a preferable embodiment, the base unit further includes an indicator symbol to indicate the moving direction.

In a preferable embodiment, the distance measuring element can record its measured distance through the information unit and store it as a predetermined distance, the circuit unit further includes a buzzer arranged on the circuit board, and the buzzer will sound when the moving distance of the base unit reaches the predetermined distance.

The characteristic of the present invention is that the rollers are continuously in contact with the plane, and the auxiliary wheel is driven to contact the plane. The rollers can make the base unit slide, allowing the user to stretch their upper limbs by themselves. When the user moves to his own limit position, the auxiliary wheel can be driven to gradually increase the moving distance of the base unit, so that the upper limb can be continuously stretched, and the limit of the extension distance and joint movement angle of the upper limb can be gradually increased.

BRIEF DESCRIPTION OF THE DRAWINGS

FIG. 6(*b*) is a side view illustrating the position of the distance measuring element after pressing.

FIG. 7(*b*) is a side view illustrating the state when the auxiliary wheel is driven.

FIG. 7(*c*) is a side view illustrating the state when the auxiliary wheel is driven and in contact with a plane.

DETAILED DESCRIPTION OF THE INVENTION

The detailed description and preferred embodiments of the invention will be set forth in the following content and provided for people skilled in the art to understand the characteristics of the invention.

Figure 1:
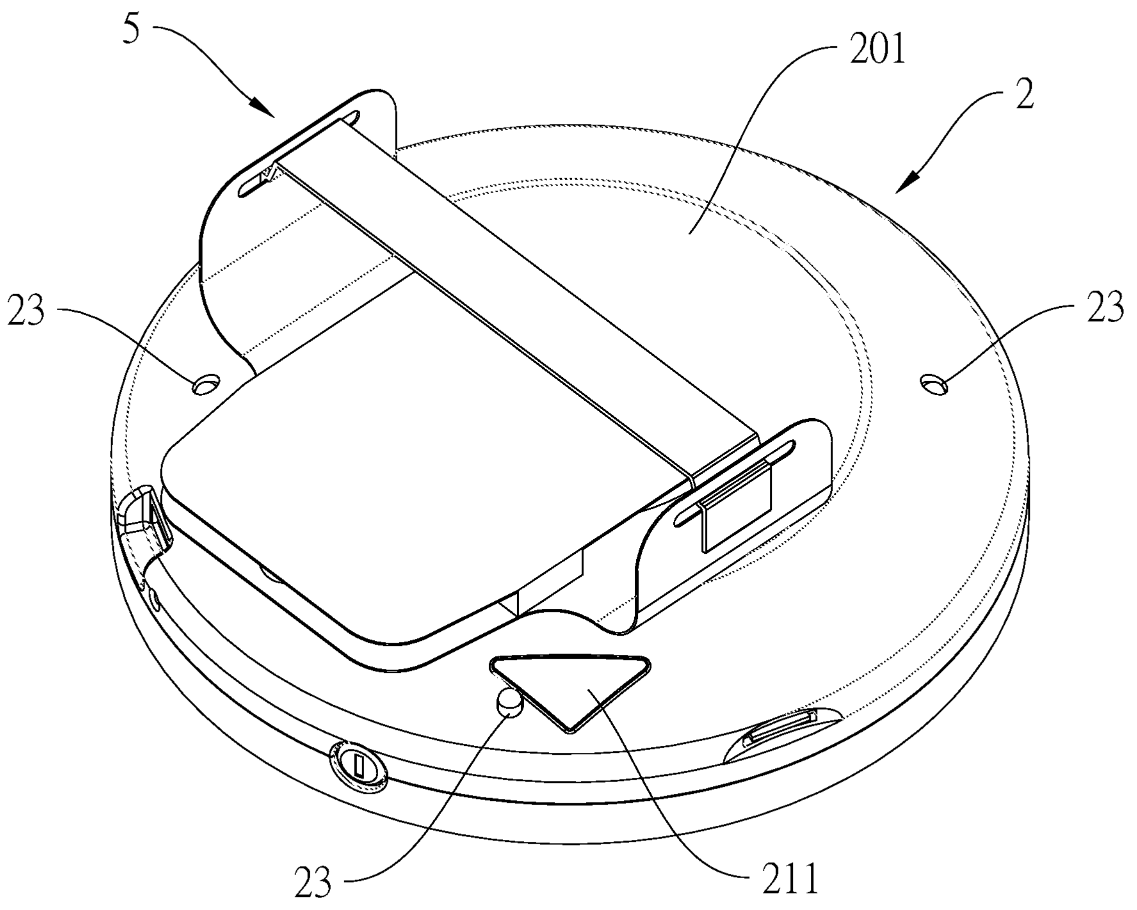
FIG. 1 is a perspective diagram of a rehabilitation device according to a preferred embodiment of this invention.
Figure 2:
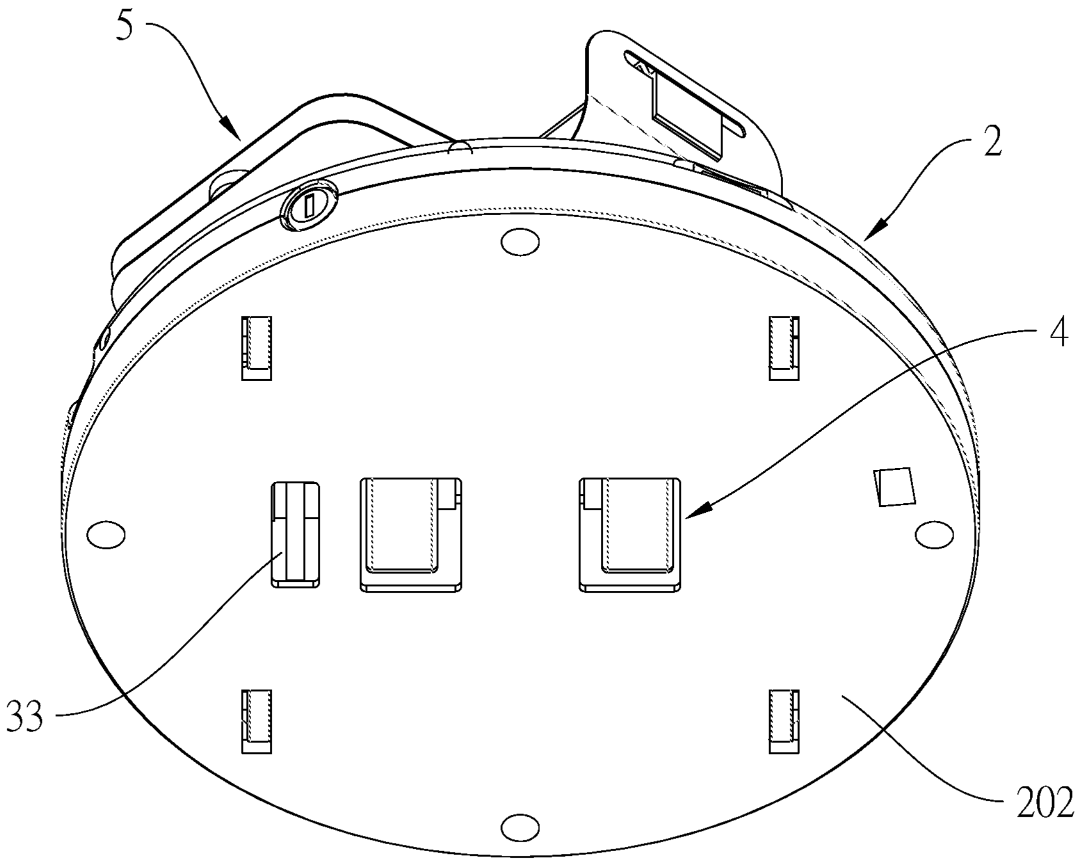
FIG. 2 is a perspective diagram illustrating the rehabilitation device from another angle.
Figure 3:
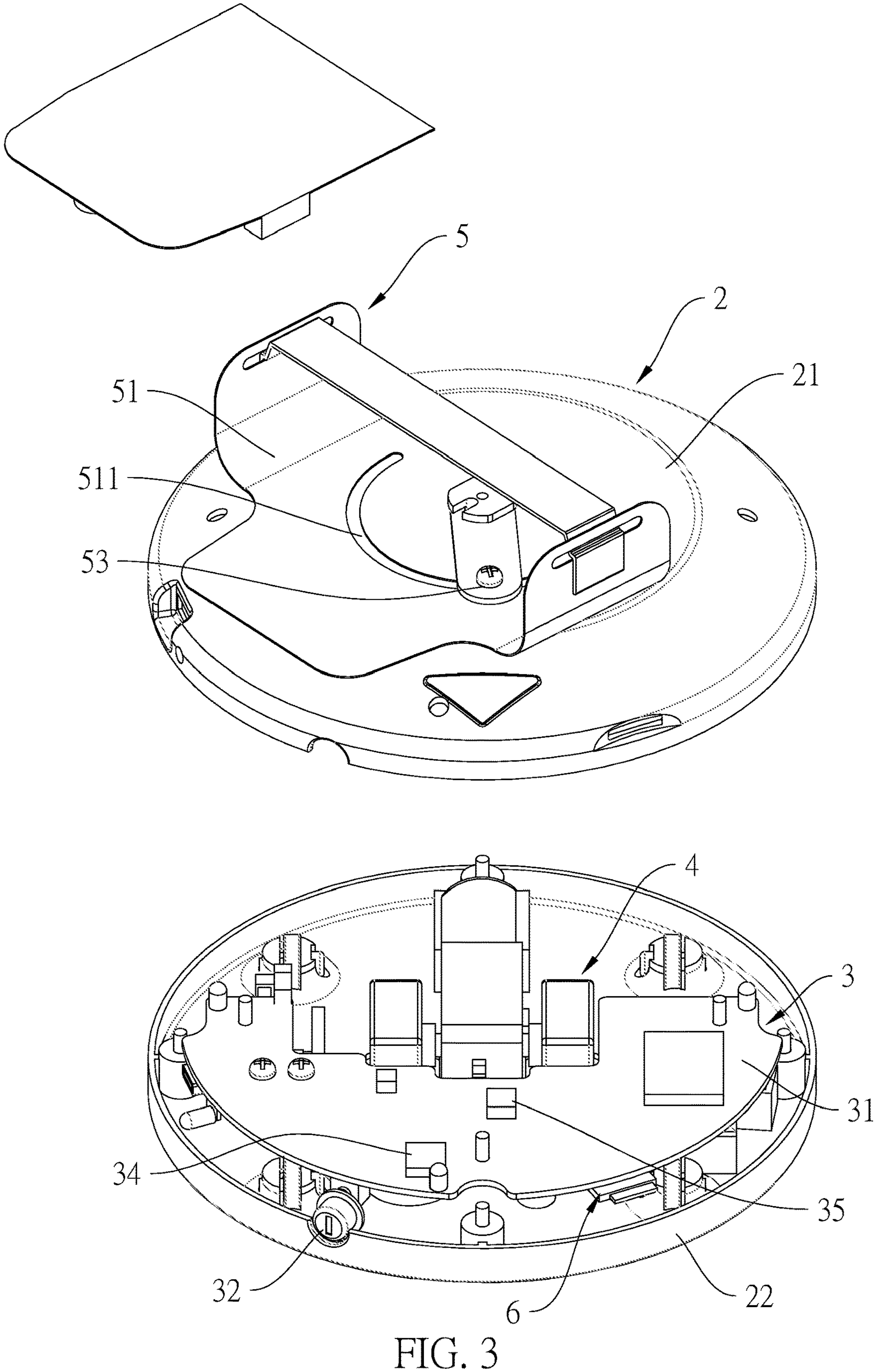
FIG. 3 is an exploded diagram illustrating the internal structure of the preferred embodiment.

Referring to FIG. 1 to FIG. 3, it is a preferred embodiment of the rehabilitation device of the present invention. The rehabilitation device comprises a base unit 2, a circuit unit 3 disposed in the base unit 2, a rolling unit 4 disposed in the base unit 2, a holding unit 5 disposed on the base unit 2, and an information unit 6 disposed in the base unit 2 and electrically connected to the circuit unit 3. The base unit 2 includes an upper case 21 and a lower case 2 combined with the upper case 21. The circuit unit 3 and the rolling unit 4 are disposed in the accommodating space surrounded by the upper casing 21 and the lower casing 22.

Referring to FIG. 2 and FIG. 3, the circuit unit 3 includes a circuit board 31, a power supply 32 electrically connected to the circuit board 31, and a distance measuring element 33 electrically connected to the circuit board 31. The base unit 2 has a top surface 201 and a bottom surface 202. The distance measuring element 33 is partially exposed on the bottom surface 202 of the base unit 2 and can measure the moving distance of the base unit 2. The distance measuring method of the distance measuring element 33 can utilize an optical element to detect the moving distance with optical image distance measurement or ultrasonic distance measurement. In this embodiment, as shown in FIG. 2, the distance measuring element 33 is a distance measuring wheel partially protruding from the bottom surface 202 of the base unit 2.

Figure 4:
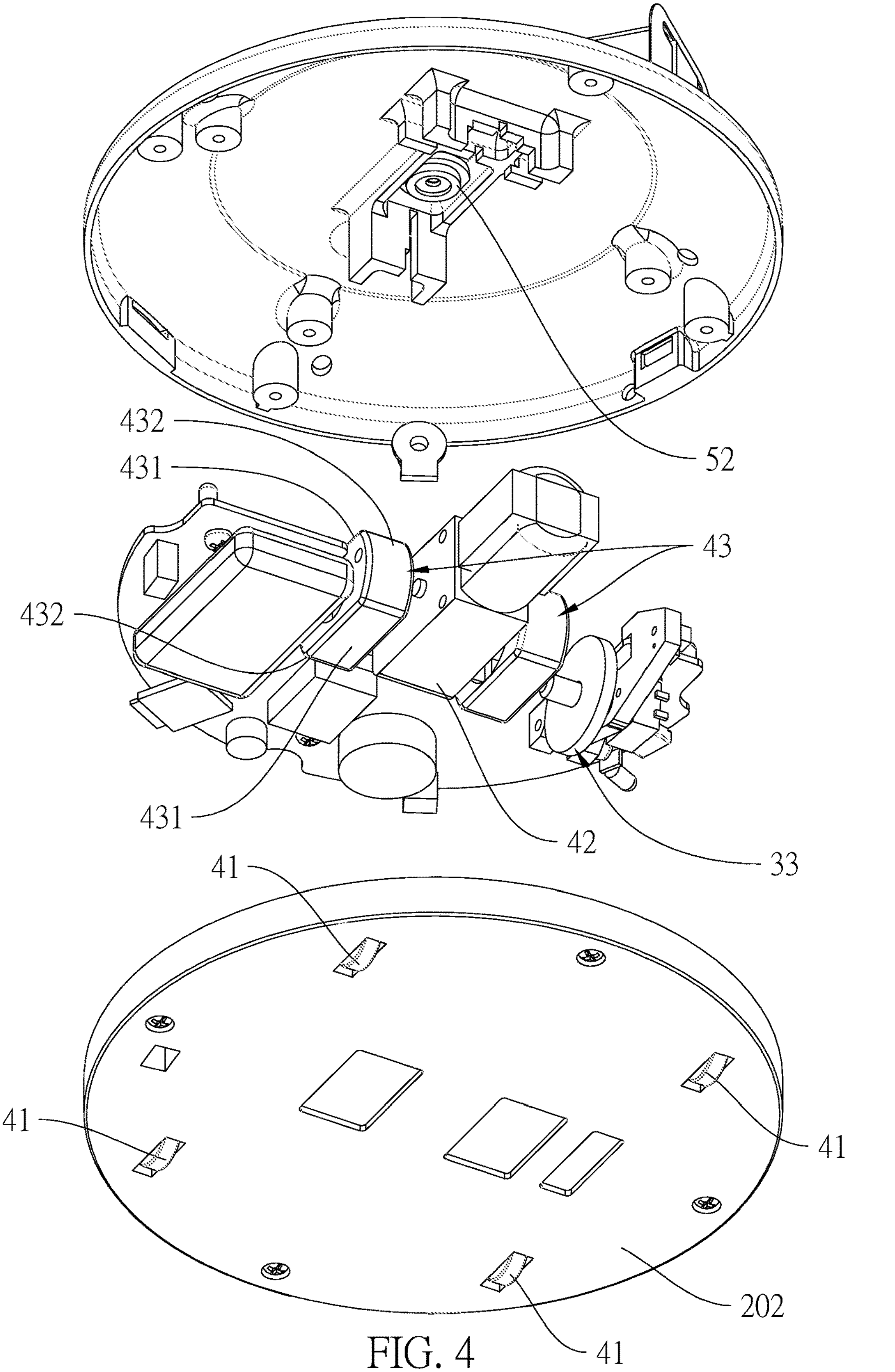
FIG. 4 is an exploded diagram illustrating the internal structure from another angle.

Referring to FIG. 2 and FIG. 4, the rolling unit 4 includes a plurality of rollers 41 arranged at intervals and partially protruding from the bottom surface 202 of the base unit 2, a driving member 42 electrically connected to the power supply 32, and two auxiliary wheels 43 driven by the driving member 42 to rotate. It should be noted that the electrical connection of the above-mentioned components can be understood by those skilled in the art, and no additional drawing and description will be mentioned here. More specifically, in this embodiment, each one of the auxiliary wheels 43 has two first surfaces 431 and two second surfaces 432 connected to two ends of the two first surfaces 431. The first surfaces 431 are substantially flat, and the second surfaces 432 are an arc surface. When the auxiliary wheels 43 are not driven, the extension direction of the first surfaces 431 corresponds to the bottom surface 202 of the base unit 2, that is, the first surfaces 431 and the bottom surface 202 are nearly parallel.

Figure 5:
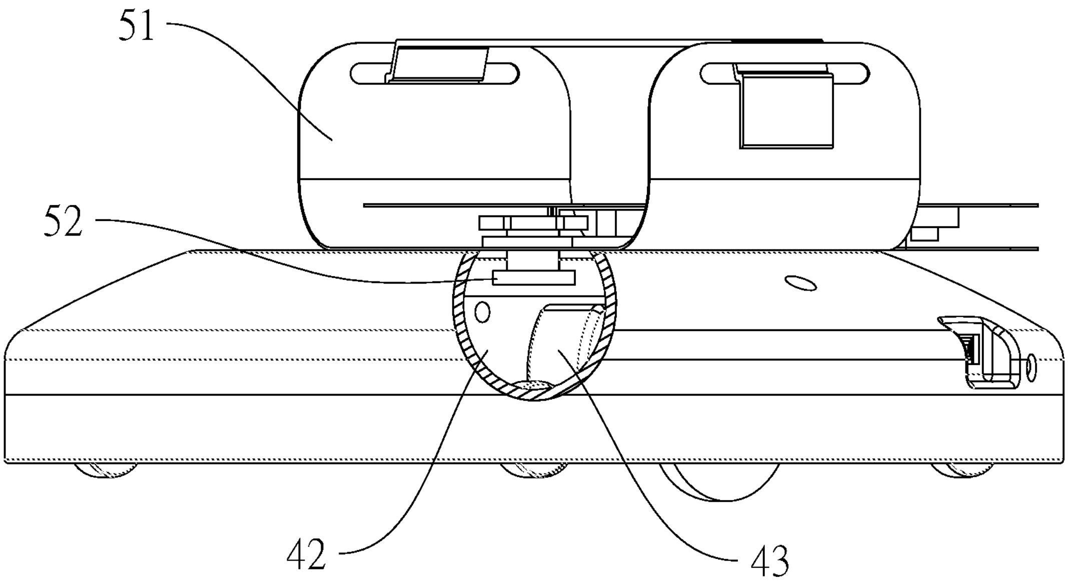
FIG. 5 is a partial cross-sectional diagram illustrating the relative position between an activation switch and a driving member.

Referring to FIG. 3 and FIG. 5, the holding unit 5 includes a holding member 51 for accommodating a user's hand, and an activation switch 52 disposed below the holding member 51. The activation switch 52 is used to activate the driving member 42 of the rolling unit 4. The holding member 51 has an arc-shaped groove 511, and the holding unit 5 further includes a locating member 53 passed through the arc-shaped groove 511 and fixed to the upper casing 21 of the base unit 2. The holding member 51 can rotate relative to the upper casing 21 through the design of the arc-shaped groove 511.

Figure 6A:
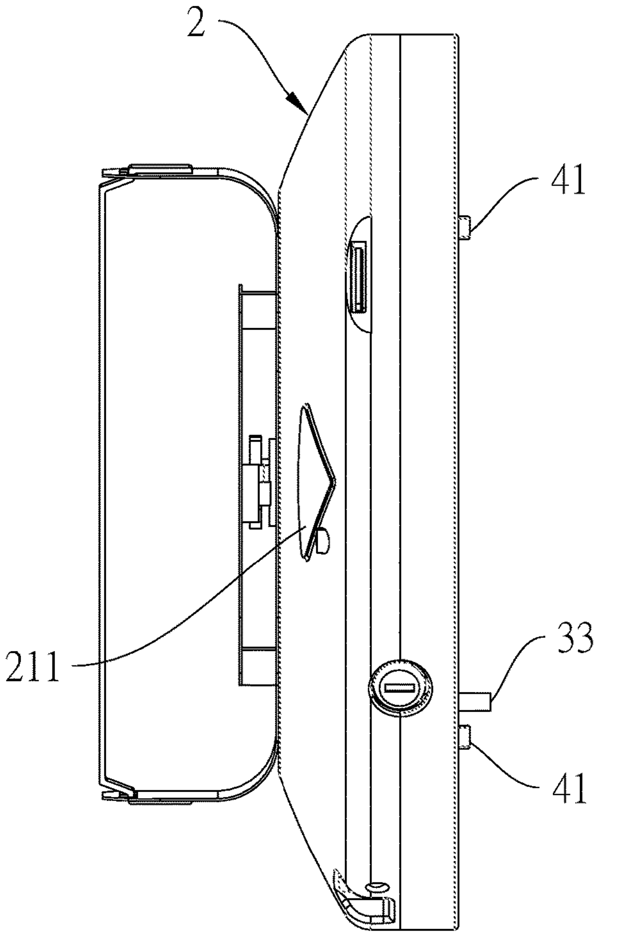
FIG. 6(*a*) is a side view illustrating the position of a distance measuring element before pressing.
Figure 6B:
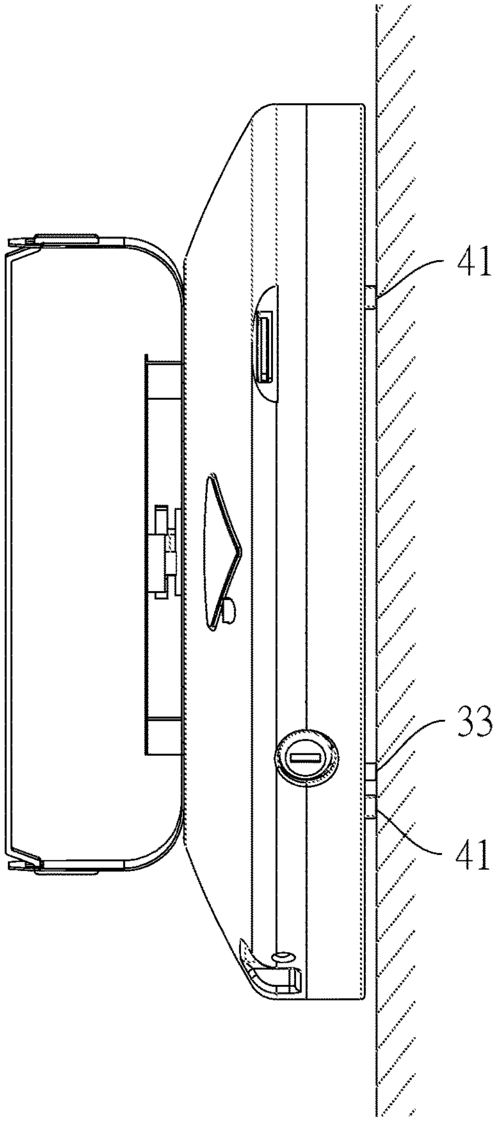
Figure 7A:
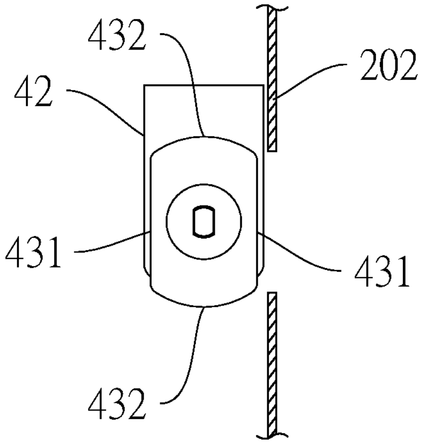
FIG. 7(*a*) is a side view illustrating the state when an auxiliary wheel is not driven.
Figure 7B:
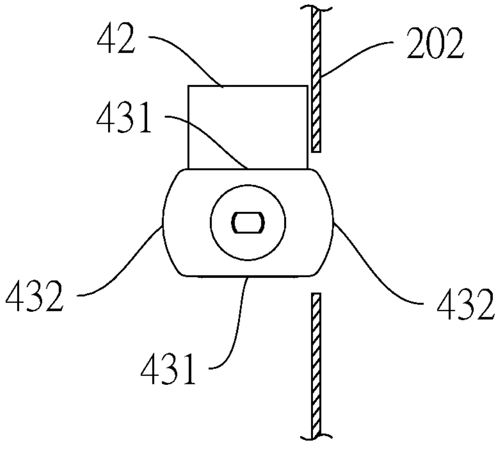
Figure 7C:
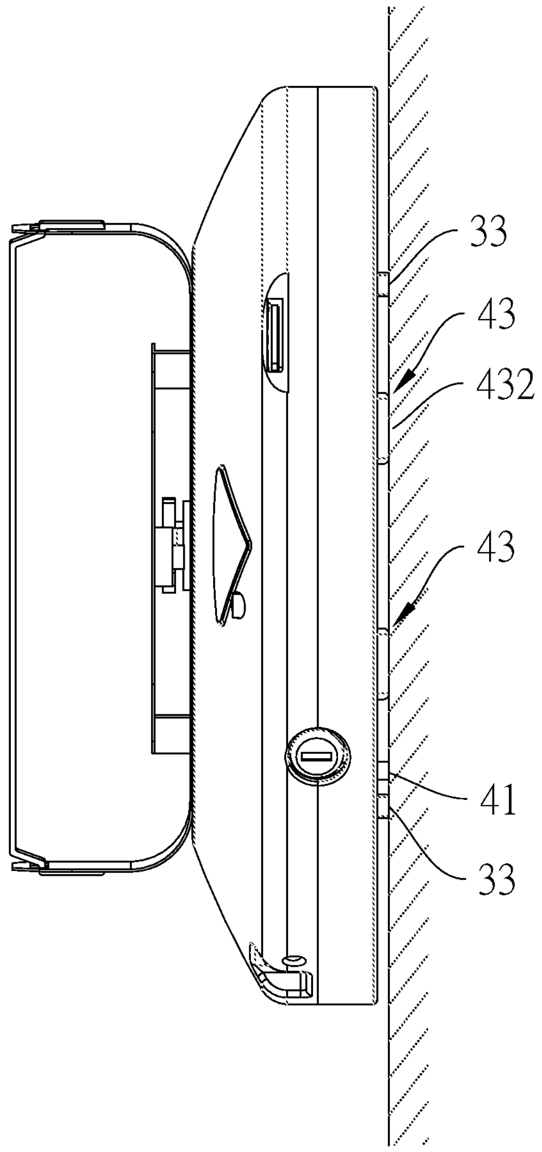

Referring to FIG. 6(*a*), the distance measuring element 33 is partially protruded from the bottom surface 202. As shown in FIG. 6(*b*), the distance measuring element 33 can also be partially retracted relative to the bottom surface 202 after being pressed. The roller 41 is continuously in contact with the plane. The distance between the end of the distance measuring element 33 and the bottom surface 202 after being pressed is not less than the distance between the end of each of the rollers 41 and the bottom surface 202. Therefore, the distance measuring element 33 can rotate on the plane together with the roller 41 after being pressed. At the same time, the distance measuring element 33 can start to record its rotation distance after being pressed and convert to the movement distance of the base unit 2 relative to the plane. Referring to FIG. 7(*a*), when the auxiliary wheel 43 is not driven, it is completely located in the base unit 2, and the first surfaces 431 are approximately parallel to the bottom surface 202. As shown in FIG. 7(*b*), the auxiliary wheel 43 will rotate when driven, and at least one of the second surfaces 432 will protrude from the bottom surface 202 and touch the plane briefly as shown in FIG. 7(*c*), and finally return to the state shown in FIG. 7(*a*).

Figure 8:
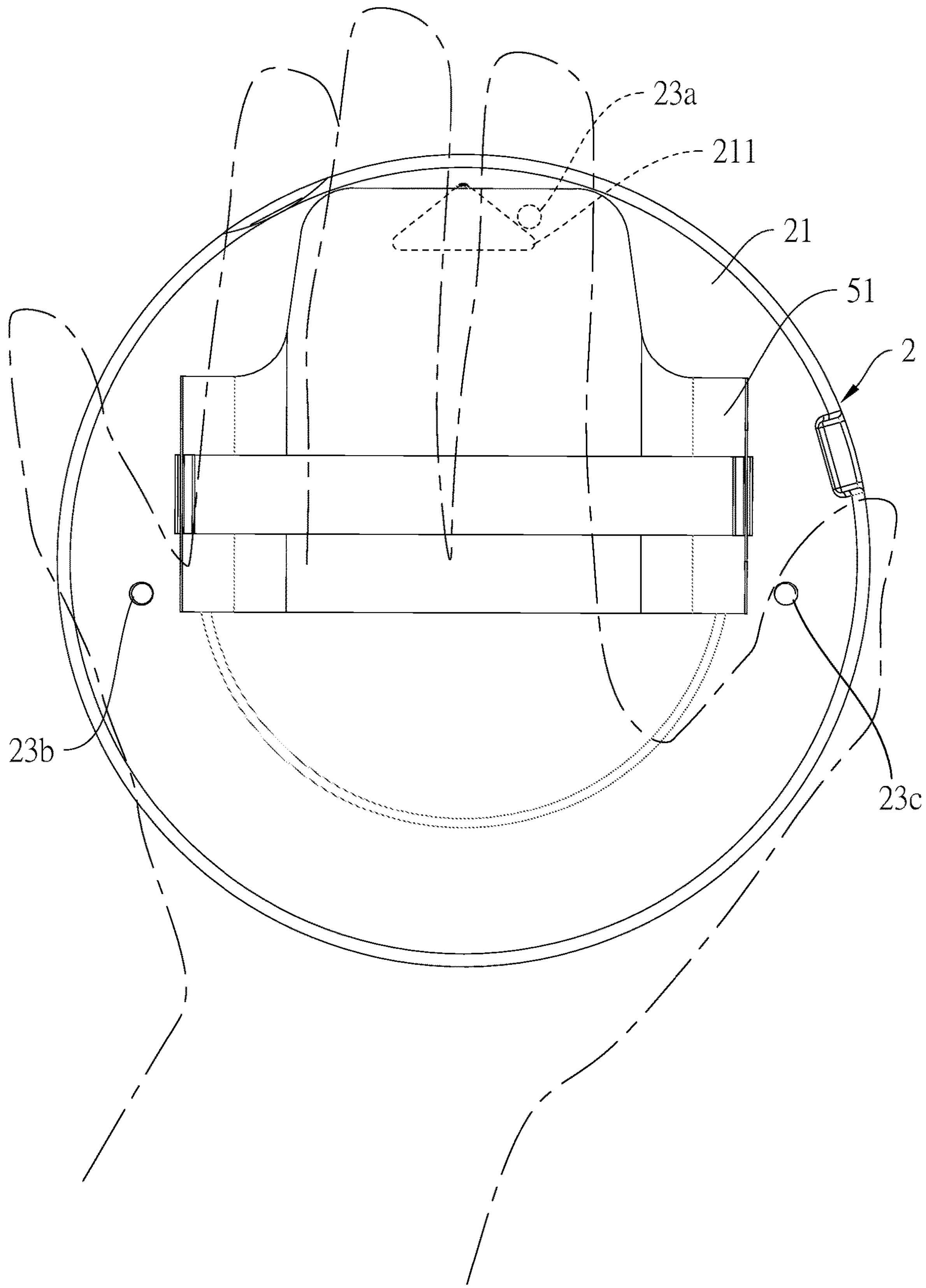
FIG. 8 is a schematic diagram illustrating the use state of the rehabilitation device moving up and down.

Referring to FIG. 8 and FIG. 6, the user puts the hand through the holding member 51 and moves the base unit 2 against the plane to stretch the muscles of the arm. The upper case 21 of the base unit 2 has an indicator symbol 211, which is used to indicate the moving direction. The moving direction is consistent with the rotating direction of the rollers 41 and the auxiliary wheels 43. When the base unit 2 is attached to the plane, the distance measuring element 33 is in a pressed state and can rotate on the plane together with the rollers 41, and simultaneously measure the moving distance of the base unit 2 relative to the plane. The distance measuring element 33 is electrically connected to the information unit 6, and the measured moving distance can be recorded in it. In more detail, the distance measuring element 33 can record its measured distance and store it as a predetermined distance through the information unit 6, and the circuit unit 3 also includes a buzzer 35 (shown in FIG. 3) arranged on the circuit board 31. When the user moves the base unit 2 again and makes the distance measuring component 33 measure the moving distance to reach the predetermined distance, the buzzer 35 will sound. In this way, after evaluating the user's muscle strength, the professional rehabilitation personnel first use the distance measuring element 33 to set the predetermined distance. After the setting is completed, when the user operates by himself, as long as he moves the base unit 2 to reach the predetermined distance, he can hear the sound from the buzzer 35 and understand the situation of his muscle stretching. The information unit 6 can be recorded through the memory card or the cloud, and can also transmit data, allowing professional rehabilitation personnel to view and analyze, and adjust the rehabilitation prescription.

Referring to FIG. 8 and FIG. 5, when the user stretches and reaches the predetermined distance, he can press the holding member 51 to activate the activation switch 52 located below the holding member 51. The activation switch 52 is pressed down to activate the driving member 42 of the rolling unit 4, thereby driving the auxiliary wheels 43 to rotate. As shown in FIG. 7(*c*), when the auxiliary wheel 43 is driven, one of the second surfaces 432 protrudes out of the bottom surface 202 to contact the plane and then returns to the base unit 2. When the second surface 432 of the auxiliary wheel 43 is in contact with the plane, it will further drive the base unit 2 to move. In this embodiment, the auxiliary wheels 43 only rotate half a circle at a time when being driven. That is, only one of the second surfaces 432 of each auxiliary wheel 43 protrudes from the bottom surface 202 and returns to the base unit 2 and stops rotating. However, the number of rotations of the auxiliary wheels 43 after being driven each time can be adjusted, which is not limited to what is disclosed in this embodiment. With the design of the auxiliary wheel 43 and its driving method, the moving distance and the stretching angle of the user's limbs can be slowly increased without causing excessive pulling, and the range of motion of the limbs and joints can be gradually improved. In this way, problems such as muscle contracture and lymphedema caused by breast cancer surgery can be alleviated.

Figure 9:
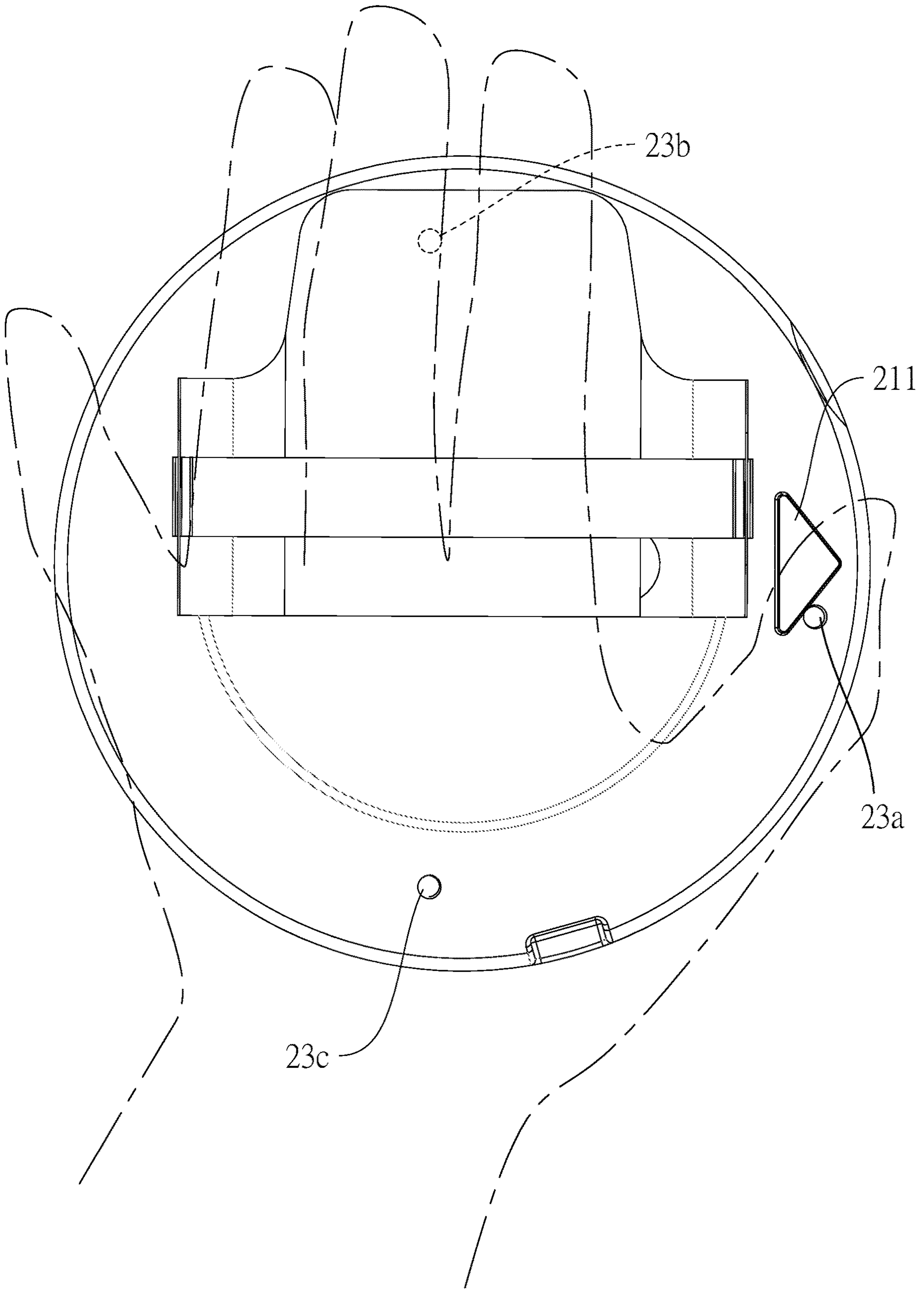
FIG. 9 is a schematic diagram illustrating the use state of the rehabilitation device moving left and right.

In general, muscle stretching is usually performed in up-down direction and left-right direction. Since the rotating direction of the roller 41 and the auxiliary wheel 43 is a single axial direction, and the user's fingers must face upwards to achieve a better stretching effect no matter the stretching direction, the base unit 2 needs to be rotated when the user wants to change the stretching direction. As shown in FIG. 3, the holding member 51 can rotate relative to the base unit 2 through the arc-shaped groove 511. When the user wants to move from the up-down direction (FIG. 8) to the left-right direction (FIG. 9), the holding member 51 is turned left or right relative to the base unit 2, and the indicator 211 points to the left or right as shown in FIG. 9 to remind the user to stretch in the direction of the indicator 211. Referring to FIG. 1 and FIG. 3, since the palm of the user still needs to maintain an upward angle when stretching in the left and right directions, the base unit 2 further includes a plurality of light emitting elements 23 to indicate the direction of the user's palm. The light emitting elements 23 are exposed on the upper case 21 and electrically connected to the power supply 32. The circuit unit 3 further includes an attitude sensor 34 arranged on the circuit board 31. The attitude sensor 34 can distinguish the direction of gravity so that the light emitting elements 23 can be illuminated corresponding to the rotation orientation of the holding member 51 through the control of the attitude sensor 34. As shown in FIG. 1, in this embodiment, there are three light-emitting elements 23 spaced about 90 degrees apart from each other. In FIG. 8, they are respectively located on the upper side and on the left and right sides. As shown in FIG. 8, when the indicator symbol 211 of the base unit 2 faces upward, the light emitting member 23*a* lights up to indicate the position of the holding member 51. As shown in FIG. 9, when the base unit 2 turns to the right and the indicator symbol 211 also faces to the right, the light emitting member 23*b* lights up, indicating the position of the holding member 51. In this way, the user can maintain the correct direction of the palm during the stretching process.

The rehabilitation device of the present invention is a portable design and is convenient to operate. The present invention is only palm-sized, light in weight and easy to carry. As long as the palm passes through the holding member 51 and moves on a plane, the muscles can be stretched. It is easy to operate and not limited by the site. Furthermore, the present invention has both active and passive stretching functions. The user can stretch himself to the position where he feels the limit (such as pain or joint angle limitation) through the roller 41. Then, the user presses the activation switch 52 to activate the auxiliary wheels 43, and slowly increases the moving distance and angle of the user's stretching without excessive pulling, and gradually improves the range of motion of the limbs and joints.

To sum up, in the rehabilitation device of the present invention, the base unit 2 slides through the rollers 41, allowing the user to perform upper limb stretching by himself. When the user moving to its own limit position, the auxiliary wheel 43 can be driven through the activation switch 52 to gradually increase the moving distance of the base unit 2 to continuously stretch the upper limbs. In this way, the extension distance of the user's upper limbs and the limit of joint movement angle can be gradually increased.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A rehabilitation device for moving on a plane, comprising:

a base unit, including a top surface and a bottom surface;

a circuit unit, arranged in the base unit and including a circuit board, a power supply electrically connected to the circuit board, and a distance measuring element electrically connected to the circuit board, wherein the distance measuring element is partially exposed on the bottom surface of the base unit and is configured to measure a moving distance of the base unit;

a rolling unit, arranged in the base unit and including a plurality of rollers arranged at intervals and partially protruding from the bottom surface of the base unit, a driving member electrically connected to the power supply, and at least one auxiliary wheel driven by the driving member, wherein, the plurality of rollers are continuously in contact with the plane, the at least one auxiliary wheel is not in contact with the plane until it is driven; and a holding unit, arranged on the top surface of the base unit and including a holding member for accommodating a user's hand, and an activation switch arranged under the holding member, wherein the activation switch is used to activate the driving member of the rolling unit.

2. The rehabilitation device as claimed in claim 1, wherein the at least one auxiliary wheel has at least one first surface, and at least one second surface connected to the at least one first surface, an extending direction of the at least one first surface corresponds to the bottom surface of the base unit when the auxiliary wheel is not driven, and the at least one second surface protrudes out of the bottom surface and back into the base unit when the auxiliary wheel is driven.

3. The rehabilitation device as claimed in claim 2, wherein the rehabilitation device further includes an information unit disposed in the base unit and electrically connected to the power supply, the distance measuring element of the circuit unit is electrically connected to the information unit and is configured to measure the moving distance of the base unit relative to the plane and record it in the information unit, and the information unit is configured to transmit data.

4. The rehabilitation device as claimed in claim 3, wherein the distance measuring element is a distance measuring wheel partially protruding from the bottom surface of the base unit.

5. The rehabilitation device as claimed in claim 3, wherein a distance measurement method of the distance measurement element is selected from optical image distance measurement or ultrasonic distance measurement.

6. The rehabilitation device as claimed in claim 3, wherein the distance measuring element is configured to record its measured distance through the information unit and store it as a predetermined distance, the circuit unit further includes a buzzer arranged on the circuit board, and the buzzer will sound when the moving distance of the base unit reaches the predetermined distance again.

7. The rehabilitation device as claimed in claim 1, wherein the holding member of the holding unit is configured to pivot relative to the base unit.

8. The rehabilitation device as claimed in claim 7, wherein the base unit includes an upper case, a lower case combined with the upper case, and a plurality of light emitting elements exposed on the upper case and electrically connected to the power supply, the circuit unit further includes an attitude sensor arranged on the circuit board, and the plurality of light emitting elements illuminate corresponding to the rotation orientation of the holding member through the control of the attitude sensor.

9. The rehabilitation device as claimed in claim 8, wherein the holding member has an arc-shaped groove, and the holding unit further includes a locating member fixed on the upper case of the base unit passing through the arc-shaped groove.

10. The rehabilitation device as claimed in claim 1, wherein the base unit further includes an indicator symbol to indicate the moving direction.

* * * * *